United States Patent

[11] 3,607,692

| [72] | Inventors | Axe Sanner<br>Ludwigshafen;<br>Carl Heinrich Krauch, Heidelberg, both of Germany |
|---|---|---|
| [21] | Appl. No. | 858,839 |
| [22] | Filed | Sept. 17, 1969 |
| [45] | Patented | Sept. 21, 1971 |
| [73] | Assignee | Badische Anilin- & Soda-Fabrik Aktiengesellschaft<br>Ludwigshafen am Rhine, Germany |
| [32] | Priority | Sept. 21, 1968 |
| [33] | | Germany |
| [31] | | P 17 95 378.5 |

[54] PROCESS FOR THE RADIATION PRODUCTION OF POROMERIC MATERIALS
5 Claims, No Drawings

[52] U.S. Cl. .................................................... 204/159.12,
117/93.31, 161/89, 161/412, 161/DIG. 2,
204/159.15, 204/159.16, 204/159.17, 260/2.5
[51] Int. Cl. ...................................................... B01j 1/10,
B01j 1/12, C08c 17/08
[50] Field of Search ........................................... 204/159.12;
260/2.5; 117/93.31

[56] References Cited
UNITED STATES PATENTS

| 3,305,464 | 2/1967 | Marons | 204/159.21 |
|---|---|---|---|
| 2,524,862 | 10/1950 | White | 204/159.16 |

FOREIGN PATENTS

| 1,414,088 | 9/1964 | France | |

*Primary Examiner*—Murray Tillman
*Assistant Examiner*—Richard B. Tuver
*Attorney*—Johnston, Root, O'Keeffe, Keil, Thompson & Shurtleff

ABSTRACT: Production of poromeric materials by impregnating flat fibrous structures with liquids containing monoolefinically unsaturated monomers and high polymeric plastics in dissolved, emulsified or dispersed form, but no polyolefinically unsaturated monomers, freezing the impregnated fibrous structures, irradiating the frozen structures to effect polymerization of the monomers, and freeing the poromeric materials from the remaining liquid. The poromeric materials may be used as floor coverings, insulating materials, leather substitutes and coating materials.

PROCESS FOR THE RADIATION PRODUCTION OF POROMERIC MATERIALS

The present invention relates to a process for the production of poromeric materials from polymers having a fibrous porous structure in which ethylenically unsaturated monomers are polymerized by irradiation.

It is known that ethylenically unsaturated monomers can be polymerized by irradiation. Sensitizers are often used in such processes and in general these processes are carried out at room temperature. The monomers are usually in liquid form, i.e. in solution or bulk. It is also known that ethylenically unsaturated monomers in crystalline form can be polymerized in bulk. Moreover, it is known that monoethylenically unsaturated monomers, such as acrylonitrile, acrylamide and vinylpyrrolidone, can be polymerized in solidified amorphous solutions, e.g. in castor oil. In these prior art processes which are summarized in "Actions Chimiques et Biologiques des Radiations," Dixième Série, 378/67, Masson & Cie Editeurs, Paris, 1966. Chapter IV, conventional polymers are obtained usually in the form of powders or gels. An exception is the polymerization of pure methacrylic acid crystals by UV-irradiation in which a small portion of fiberlike polymer is formed in addition to amorphous polymer within one and the same crystal (cf, C. H. Bamford, A. D. Jenkins and J. C. Ward, J. Polymer Sci., 37, 48 (1966)).

Furthermore, it is known from French Patent No. 1,414,088 to impregnate nonwovens with aqueous polymer dispersions and then to cool the impregnated nonwoven materials down to a temperature at which the aqueous polymer dispersions freeze. In this process the polymer dispersion solidifies with the formation of fiberlike agglomerations of the polymer.

The object of the invention is to provide a process for the production of poromeric materials from fiberlike polymers by direct polymerization of olefinically unsaturated monomers. Other objects of the invention will become obvious as the description proceeds.

We have now found that these objects are achieved and the production of poromeric materials can be carried out by impregnating flat fibrous structures with liquids containing monoolefinically unsaturated monomers and high polymeric plastics in dissolved, emulsified or dispersed form, but no polyolefinically unsaturated monomers, freezing the impregnated fibrous structures with complete or partial crystalline solidification of the liquid, irradiating the at least partially solidified crystalline structures to effect polymerization of the monoolefinically unsaturated monomers and freeing the poromeric materials from the remaining liquid.

It is surprising that polymers having a fiberlike structure are obtained in the process according to the invention because, when monoolefinically unsaturated monomers which, as solutions or emulsions in the absence of high molecular weight polymers, have been caused to undergo complete or partial crystalline solidification, are polymerized alone, only gellike brittle products are obtained which do not contain any portions having a fiberlike structure.

Examples of monoolefinically unsaturated monomers which are particularly suitable for the process according to the invention are acrylic and/or methacrylic esters of alkanols having 1 to 8, particularly 1 to 4, carbon atoms; acrylic and/or methacrylic esters of crycloalkanols having 5 or 6 carbon atoms in the ring or of polyhydric, particularly dihydric or trihydric, alcohols having 2 to 6 carbon atoms; acrylic and/or methacrylic amides or their N-methylol compounds or their N-methylol ethers of alcohols having 1 to 4 carbon atoms. Specific examples of such particularly suitable monomers are the methyl, ethyl, n-propyl, n-butyl, isobutyl, n-hexyl, cyclohexyl and 2-ethylhexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylolacrylamide, N-methylolmethacrylamide, N-methylolacrylamide methyl ether and N-methylolmethacrylamide n-butyl ether. The monomers may also be used with advantage in admixture with one another. It may be advantageous to replace up to 25 percent by weight of the monomers by acrylic or methacrylic acid. If hard stiff products are required, up to 50 percent by weight of the monomers can be replaced by acrylic or methacrylic acid.

Examples of monoolefinically unsaturated monomers which are also suitable, particularly in admixture with the abovementioned monomers, are vinyl esters of aliphatic carboxylic acids having 2 to 18 carbon atoms, -propoxyethyl as vinyl acetate, vinyl propionate, vinyl n-butyrate, vinyl laurate and vinyl stearate; vinyl ethers of alcohols having 4 to 8 carbon atoms, such as vinyl isobutyl ether and vinyl n-octyl ether; N-vinyl compounds, such as N-vinyl caprolactam and N-vinylcarbamic acid ethyl ester; vinyl chloride and vinylidene chloride; vinylaromatic compounds having 8 or 9 carbon atoms, such as styrene and vinyltoluene; and vinylthioethers, such as vinylthioethanol.

In the process according to the invention substances which contain one or more chromophoric groups in addition to a polymerizable double bond, e.g. 1-amino-4-acryloylaminoanthraquinone-2-carboxylic acid-2'-propoxyethyl ester, may be used as ethylenically unsaturated monomers.

The monomers may in general contain conventional inhibitors for thermal polymerization because they do not usually have an adverse effect on the process. In the process of the invention the monomers are employed in dissolved, emulsified or dispersed form. The liquids used should undergo crystalline solidification preferably in the range of +50° to −25° C. Examples of suitable liquids are acetic acid, dioxane, trioxane, benzene, urea and in particular water. If emulsions or dispersions of the monomers are employed, conventional emulsifying agents and if desired protective colloids may be used in their preparation. Suitable emulsifiers are described in detail for example in Houben-Weyl, "Methoden der organischen Chemie," Vol. XIV/1, Makromolekulare Stoffe, Georg Thieme Verlag, Stuttgart, 1961, in particular pages 192 to 208. Suitable compounds are for example anionic emulsifying agents; such as the alkali metal salts of fatty acids, the alkali metal salts of acid fatty alcohol-sulfuric acid esters, particularly sodium sulfonate, alkali metal and ammonium salts of alkyl and alkylaryl sulfonic acids, salts or fatty acid condensation products with oxyalkylcarboxylic acids, aminoalkyl carboxylic acids, particularly alkali metal salts of sulfonated ethylene oxide adducts of fatty alcohols or alkyl phenols which contain 5 to 30, particularly 8 to 20, ethylene oxide radials, as well as cationic emulsifying agents, such as salts of alkylamines, aryl, alkylaryl or resin amines and quaternary ammonium compounds, such as N-dodecyl-N-trimethylammonium chloride. Moreover, there may be used nonionic emulsifying agents, e.g. the reaction products of alkylene oxides, in particular ethylene oxide, with fatty alcohols or alkyl phemols whose alkyl groups preferably contain 8 to 12 carbon atoms. Mixtures of emulsifying agents, e.g. mixtures of nonionic and anionic emulsifiers, may also be used in the process of the invention. The content of the emulsifying agents of the said type is generally from 0.01 to 10 percent, preferably from 0.1 to 3 percent, by weight with reference to the sum of the amounts of monomeric and emulsified or dispersed high molecular weight plastics.

The amount of dissolved, emulsified or dispersed monomers is in general from 0.5 to 30 percent, preferably from 2 to 20 percent, by weight with reference to the aqueous solution, emulsion or dispersion containing the high molecular weight plastics in dissolved or dispersed form.

Suitable high polymer plastics which usually have molecular weights of more than 10,000 are all synthetic high polymers obtained by conventional polymerization and polycondensation processes, provided that they are soluble in water, acetic acid, dioxane or benzene or dispersible in water or that they are present in the form of solutions or dispersions obtained in their manufacture. Suitable compounds are for example homo- and/or copolymers of mono- and/or diolefinically unsaturated monomers, e.g. of mono- or diolefins having preferably 2 to 5 carbon atoms, such as ethylene, propylene, isobutylene, butadiene, chloroprene and isoprene, of α, β- ethylenic-unsaturated mono- and dicarboxylic acids, in particular those having 3 to 5 carbon atoms, such as acrylic acid, methacrylic acid, maleic acid and itaconic acid and/or amides or substituted amides, nitriles and/or esters thereof, in particular those of alkanols having 1 to 8 carbon atoms, such as the methyl, ethyl, propyl, n-butyl, tert-butyl, n-hexyl and 2-ethylehexyl esters of acrylic and methacrylic acids and diethyl and di-n-butyl maleates, acrylamide, methacrylamide and N-n-butoxymethyl acrylamide, acrylonitrile and methacrylonitrile, of vinylaromatic monomers, such as styrene, α-methylstyrene, divinylbenzene and vinyltoluenes which in general contain only 1 benzene nucleus, of vinyl esters of monocarboxylic acids which in general contain from 2 to 12 carbon atoms, in particular vinyl acetate, vinyl propionate, vinyl butyrate and vinyl laurate, of vinyl halides, in particular vinyl chloride, vinylidene chloride and vinyl fluoride, of vinyl ethers, in particular alkanols having 1 to 4 carbon atoms, such as vinyl methyl ether and vinyl isobutyl ether, of heterocyclic vinyl compounds, such as vinylpyridines, N-vinylpyrrolidone and N-vinylimidazolium salts, e.g. N-vinyl-N-methylimidazolium chloride and N-vinyl-N-methylimidazolium methosulfate. Suitable high polymeric plastics are in addition for example saturated linear polyesters having recurring carboxylic ester groups in the main chain manufactured in a conventional manner, in particular polyethylene glycol terephthalate, polyurethanes, in particular the polycondensation products of hexamethylene diisocyanate and alkanediols having 2 to 6 carbon atoms, such as glycol and 1,6-hexanediol synthetic linear polyamides with recurring units having the general formula -CONH- in the chain molecule, such as poly-ε-caprolactam, polylaurolactam and polycondensation products of aliphatic dicarboxylic acids, such as adipic acid or suberic acid, and of aliphatic diamines, such as hexamethylene diamine, decamethylene diamine and 4,4'-diamino-dicyclohexylmethane, polyvinyl alcohols and modified products thereof, poly-1.2-alkylene oxides, in particular polyethlene oxides and poly-1,2-propylene oxides, polyacetals, such polyethylene polyformaldehyde, polycarbonates, polyureas, cellulose esters and ethers, in particular cellulose acetate as well as polymides such as polyethyleneimine.

The polymers and polycondensates of the said type may be prepared in a conventional manner and dissolved or dispersed in water. Solution or emulsion polymers, e.g. in the form of solutions or dispersions obtained in heir manufacture, can be used with advantage. Solutions or dispersions can also be used which have been prepared from the polymers or polycondensates, e.g. from polyethylene, synthetic polyamides, polyalkylene oxides or polyformaldehyde. In the preparation of polymer dispersions by emulsion polymerization or so-called secondary dispersions, conventional emulsifiers and protective colloids may be added. Examples of suitable emulsifiers are given above.

Of particular interest are those aqueous polymer dispersions, which re used as binders, in particular as binders for nonwoven materials. Particularly advantageous aqueous dispersions are those based on homo- and copolymers of acrylic and/or methacrylic acid derivatives, such as acrylic and/or methacrylic esters of alkanols having 1 to 8, particularly 1 to 4, carbon atoms, acrylic and/or methacrylic esters of cycloalkanols having 5 or 6 carbon atoms in the ring or of polyhydric, particularly dihydric or trihydric, alcohols having 2 to 6 carbon atoms; of acrylic and/or methacrylic amides or their N-methylol compounds or their N-methylol ethers of alcohols having 1 to 4 carbon atoms; and of acrylic and/or methacrylic acid. Examples of suitable homo- and/or copolymers are the methyl, ethyl, n-propyl, n-butyl, isobutyl, n-hexyl, 2-ethylhexyl and cyclohexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylolacrylamide, N-methylolmethacrylamide, N-methylolacrylamide methyl ether and N-methylolmethacrylamide n-butyl ether. Moreover, aqueous polymer dispersions based on copolymers with other conventional comonomers, e.g. styrene, containing at least 40 percent by weight of units of the said acrylic or methacrylic derivatives are advantageous. Aqueous polymer dispersions based on copolymers of butadiene or vinyl esters, particularly carboxylic acids having 2 to 4 carbon atoms, are also advantageous.

Aqueous solutions and dispersions of vinyl chloride homopolymers and copolymers, styrene homopolymers and copolymers, polyisobutylene, synthetic polyamides, polyurethanes and polyvinylpyrrolidone are also of interest.

The amount of high polymeric plastics of the said type in the monomer solutions or emulsions may vary within wide limits. It is generally from 0.1 to 30 percent, preferably from 2 to 20 percent, by weight with reference to the total amount of the solution, emulsion or dispersion containing the monomers and the plastics, The weight ratio of monomers to plastics is generally 0.5 to 10:1, advantageously 3 to 8:1.

The solutions or dispersions of the monomers and the high molecular weight plastics may also advantageously contain small amounts of photoinitiators, i.e. compounds which decompose into radicals under the action of light or which form radicals under the action of light as result of reactions, these radicals initiating the polymerization. Examples of suitable photoinitiators are vicinal ketaldonyl compounds, such as diacetyl and benzil, α-ketaldonyl alcohols, such as benzoin, acyloin ethers, such as benzoin methyl ether and α-substituted aromatic acyloins, such as α-methylbenzoin, aromatic ketones and aldehydes, such as benzophenone, propiophenone and benzaldehyde. These photoinitiators are generally added in amounts of 0.001 to 10 percent, preferably from 0.01 to 3 percent, by weight with reference to the monomers. Inorganic photosensitizers which decompose into radicals or ions when exposed to the action of light are also suitable, for example uranyl salts, copper salts and salts of trivalent iron with organic acids, if desired in admixture with peroxides, such as hydrogen peroxide and potassium persulfate.

Flat fibrous structures are impregnated with the solutions, emulsions or dispersions of the monomers and the high polymeric plastics for example by passing them through the liquids containing them, by placing them in tanks holding the said liquid or by spraying them with the said liquids. Particularly suitable flat fibrous structures are nonwovens of natural or synthetic fibers which may be needled in a conventional manner. Woven or knitted fabrics of natural or synthetic fibers which have preferably been provided with a marked nap also suitable. Wool, cellulosic, cellulose acetate, viscose, polypropylene, polyamide, polyacrylonitrile and/or polyethylene terephthalate fibers may for example be used.

Impregnation is preferably carried out in such a way that 50 to 500 parts by weight of monomers and high polymeric plastics are used per 100 parts by weight of flat fibrous structure.

The fibrous structures impregnated with the liquids are subjected to conditions under which the liquid undergoes complete or partial crystalline solidification; this is usually effected by cooling. By "partial crystalline solidifcation" we mean the partial solidification by the liquid in crystalline form and not the crystallization of the monomer out of the liquid without the simultaneous separation of crystals of the liquid. Freezing may for example be effected on a cold surface, e.g. a cooled endless belt or a cooling roller, or advantageously in cooled gap.

The at least partially solidified crystalline structures are then irradiated for example with mercury vapor lamps, xenon lamps or fluorescent tubes, Daylight and sunlight may also be used. In general electromagnetic radiation having a wavelength of less than 0.70 μ, advantageously less than 0.39 μ, is suitable. Ionizing radiation is also suitable, e.g. electron beams, X-rays, as well as mixed rays emitted by radioactive materials, e.g. nuclear fuel elements. The duration of irradiation may vary within wide limits. The higher the energy level of the radiation and the higher the radiation density, the shorter the radiation time.

In some cases radiation times of a few seconds are sufficient, e.g. when using electron beams with a high radiation density. In some instances radiation times of several minutes are necessary, e.g. when sun rays are used. When rays with a very high energy level are used, e.g. electron beams, photoinitiators need not be present. However, photoinitiators are needed when irradiation is effected with light of the visible and ultraviolet ranges of the spectrum having a greater wavelength than corresponds to the absorption of the materials to be polymerized.

The monomers are polymerized as a result of the irradiation. Monomer conversion in the polymerization is generally between 60 and 90 percent or higher. After the polymerization the liquid and any residual monomers and polymers are separated from the poromeric materials obtained.

The products obtained by the process according to the invention can for example be used as floor coverings, thermal insulating materials, especially at elevated temperatures, leather substitutes and coating materials.

The invention is illustrated by the following Examples in which parts are parts by weight.

EXAMPLE 1

A conventional nonwoven of cellulosic fibers (weight of nonwoven material: 100 g./m.$^2$) is impregnated in a coolable tank with a solution of 0.35 parts of benzoin methyl ether, 29 parts of 1,4-butanediol monoacrylate and 1 part of polyacrylamide (K value = 143 determined according to H. Fikentscher, Cellulosechemie, 13, 58 (1932) in 600 parts of water. The tank is then cooled to −35° C. and the liquid, after solidifying, is irradiated for 10 minutes with a Philips black-light lamp TL W/08. This is followed by thawing out, washing the product several times with water and drying at 60–80° C. A poromeric material is obtained which has a water vapor absorption of 8.1 percent after 2 hours and of 17.7 percent after 24 hours, a tensile strength of 79 kg./cm. and an elongation of 34 percent.

The polymer yield is 94 percent by weight, based on the amount of monomer used. When 1 part of polyacrylic acid (K value about 150) or 0.1 part of polyethylene oxide WSR 301 is used instead of the polyacrylamide, poromeric materials having practically the same properties are obtained, but their tensile strength is more than 100 kg./cm.

EXAMPLE 2

The procedure of Example 1 is followed, but an emulsion of 29 parts of ethyl acrylate in a solution of 1 part of polyethyleneimine (molecular weight 30,000) in 600 parts of water, which solution contains 0.35 part of benzoin methyl ether, is used instead of the specified monomer/polymer solution. At a polymer yield of 60 percent by weight, based on the amount of ethyl acrylate used, a poromeric material having a tensile strength of 33 kg./cm., an elongation of 76 percent and a water vapor absorption of 10 percent after 24 hours is obtained.

EXAMPLE 3

The procedure of Example 1 is followed, but a solution of 29 parts of n-butyl acrylate, 1 part of polyvinyl chloride (K value 57) and 0.35 part of benzoin methyl ether in 600 parts of dioxane is used instead of the specified monomer solution. At a yield of newly formed polymer of 65 percent by weight, based on the amount of n-butyl acrylate, a poromeric material having a tensile strength of 37 kg./cm. and n elongation of 142 percent is obtained.

EXAMPLE 4

The procedure of Example 1 is followed, but a mixture of an emulsion of 29 parts of n-butyl acrylate nd 0.35 part of benzoin isopropyl ether in a solution of 0.5 part of sulfonated castor oil in 600 parts of water, and 15 parts of a 40 percent dispersion of a copolymer derived from 85 parts of n-butyl acrylate, 7 parts of acrylic acid, 3 parts of 1,4-butanediol monoacrylate and 5 parts of N-methylol-acrylamide is used instead of the specified monomer solution. A poromeric material is obtained at a yield of 77 percent by weight, based on the amount of monomers used.

EXAMPLE 5

The procedure of Example 1 is followed, but a mixture of an emulsion of 25 parts of ethyl acrylate and 0.35 part of benzoin methyl ether in a solution of 0.5 part of sulfonated caster oil in 600 parts of water, and 20 parts of a 55 percent dispersion of a copolymer derived from 85 parts of vinylidene chloride and 15 parts of methyl acrylate is used instead of the specified monomer solution. A poromeric material is obtained at a yield of newly formed polymer of 57 percent by weight, based on the amount of ethyl acrylate used.

EXAMPLE 6

The procedure of Example 1 is followed, but a mixture of an emulsion of 25 parts of 3-chloro-2-hydroxypropyl acrylate and 0.35 part of benzoin methyl ether in a solution of 0.5 part of sulfonated castor oil in 600 parts of water, and 20 parts of a 40 percent aqueous polystyrene dispersion containing, as plasticizer, 40 parts of butyl phthalate per 60 parts of polystyrene is used instead of the specified monomer solution. A poromeric material is obtained at a yield of 5 percent by weight, based on the amount of 3-chloro-2-hydroxypropyl acrylate used.

EXAMPLE 7

The procedure of Example 1 is followed, but a spun-bonded polypropylene fabric weighing about 90 g./m.$^2$ is used instead of the specified nonwoven material. An emulsion of 11 parts of 2-ethylhexyl acrylate, 10 parts of N-methylolacrylamide, 6 parts of cellulose acetate (content of acetate radicals 53.5 percent; K value 900) and 0.35 part of benzoin isopropyl ether in 300 parts of acetic acid is used as the liquid. A poromeric material is obtained at a yield of 90 percent by weight, based on the amount of monomers used.

EXAMPLE 8

The procedure of Example 1 is followed, but a spun-bonded polypropylene fabric weighing about 90 g./m.$^2$ is used instead of the specified nonwoven material. A mixture of an emulsion of 24 parts of n-butyl acrylate, 5 parts of acrylic acid and 0.35 part of benzoin methyl ether in 600 parts of water, which mixture contains 0.5 part of sulfonated castor oil, and 12 parts of a 50 percent dispersion of a copolymer derived from 80 parts of vinyl propionate and 20 parts of tert-butyl acrylate is used as the monomer solution. A poromeric material is obtained at a yield of 69 percent by weight, based on the amount of monomers used.

When 10 parts of a 60 percent secondary polyamide dispersion of a cocondensate of adipic acid/hexamethylenediamine salt and caprolactam (molar ratio 1:1) is used instead of the above dispersion, a poromeric material is obtained at a yield of 60 percent by weight, based on the amount of monomers used.

EXAMPLE 9

A spun-bonded polypropylene fabric weighing about 90 g./m.$^2$ is impregnated in a coolable tank with a solution of 18 parts of butanediol-1,4 monoacrylate, 3 parts of acrylamide, 6 parts of a polyurethane (prepared from adipic acid, butanediol-1,4 and methylene-diphenyl diisocyanate; molecular weight about 15,000) and 0.35 part of benzoin isopropyl ether in 300 parts of dioxane. The impregnated structure is frozen at −15° C. and then irradiated for 30 minutes with eight Philips black-light lamps TL W/08. This is followed by thawing out, squeezing out the solvent, washing the product several times with water and drying. A poromeric material is obtained at a yield of 60 percent by weight, based on the amount of monomers used.

EXAMPLE 10

The procedure of Example 9 is followed, but a solution of 13.3 parts of n-butyl acrylate, 4.1 parts of methacrylic acid and 5 parts of a polyester (condensation product of 4 moles of dimethyl terephthalate, 4.5 moles of ethylene glycol and 4.3 moles of hexanediol-1,6, K value about 30) and 0.35 part of benzoin isopropyl ether in 300 parts of dioxane is used instead of the specified solution. A poromeric material is obtained at a yield of 55 percent by weight, based on the amount of monomers used.

EXAMPLE 11

25 parts of cyclohexyl acrylate, 4 parts of methacrylamide and 0.35 part of benzoin isopropyl ether are emulsified in 300 parts of water with the aid of 0.5 part of sulfonated castor oil. 15 parts of a 40 percent aqueous dispersion of a copolymer derived from 50 parts of n-butyl acrylate and 50 parts of styrene is added to this emulsion. This liquid is then applied to a nonwoven material, cooled and irradiated as described in Example 1. This is followed by thawing out, washing the product and drying. A poromeric material is obtained at a yield of 63 percent by weight, based on the amount of monomers used.

We claim:

1. A process for the production of poromeric material, wherein (a) a flat fibrous structure is impregnated with a liquid containing 0.5 to 30 percent by weight of monoolefinically unsaturated monomers and 0.1 to 30 percent by weight of dissolved, emulsified or dispersed polymeric plastics selected from the group consisting of synthetic high polymers having a molecular weight of more than 10,000 and being soluble in water, acetic acid, dioxane or benzene and of aqueous polymer dispersions conventionally used as binders for nonwoven materials, but no polyolefinically unsaturated monomers, the weight ratio of monomer to plastics being 0.5 to 10:1, (b) the impregnated fibrous structure is frozen with complete or partial crystalline solidification of said liquid, (c) the frozen structure is irradiated by electromagnetic radiation having a wavelength of less than 0.70 $\mu$ or ionizing radiation until the monoolefinically unsaturated monomers are polymerized, (d) said frozen structure is thawed and (e) said liquid is separated from the resultant poromeric material.

2. A process as claimed in claim 1, wherein the at least partially solidified crystalline structure is irradiated with electromagnetic radiation having a wavelength of less than 0.70 $\mu$ in the presence of photoinitiators.

3. A process as claimed in claim 1, wherein the monomers are acrylic or methacrylic esters of alcohols having 1 to 8 carbon atoms, acrylamides or methacrylamides or their N-methylol derivatives.

4. A process as claimed in claim 1, wherein the said liquid is water.

5. A process as claimed in claim 1, wherein the high polymeric plastics are in aqueous dispersion and are selected from the group consisting of homopolymers and copolymers of acrylic esters of alcohols having 1 to 8 carbon atoms, methacrylic esters of alcohols having 1 to 8 carbon atoms, acrylamides, methacrylamides, N-methylol compounds of acrylamides, N-methylol compounds of methacrylamides, and of mixtures of the said homopolymers and copolymers.

PO-1050
(5/69)

UNITED STATES PATENT OFFICE
CERTIFICATE OF CORRECTION

Patent No. 3,607,692     Dated September 21, 1971

Inventor(s) Axel Sanner and Carl Heinrich Krauch

It is certified that error appears in the above-identified patent and that said Letters Patent are hereby corrected as shown below:

First page, left-hand column, first line, "Axe" should read -- Axel --.

Column 1, line 61, "crycloalkanols" should read -- cycloalkanols --.

Column 3, line 40, "polymides" should read -- polyimides --; line 45, "heir" should read -- their --; line 55, "re" should read -- are --.

Column 4, line 57, "solidifcation" should read -- solidification --; line 63, "cooled gap" should read -- a cooled gap --.

Column 5, line 30, "(1932)" should read -- (1932)) --; line 71, "nd" should read -- and --.

Signed and sealed this 11th day of April 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,607,692            Dated   September 21, 1971

Inventor(s)    Axel Sanner et al.

It is certified that error appears in the above-identified patent and that said Letters Patent are hereby corrected as shown below:

Column 2, line 7, "-propoxyethyl" should read -- such --.
Column 3, line 37, "polyethlene" should read -- polyethylene --;
same column 3, line 38, "such polyethylene polyformaldehyde" should read -- such as polyformaldehyde --.

Signed and sealed this 6th day of June 1972.

(SEAL)
Attest:

EDWARD M. FLETCHER, JR.                ROBERT GOTTSCHALK
Attesting Officer                      Commissioner of Patents